US012711778B2

(12) United States Patent
Lee

(10) Patent No.: US 12,711,778 B2
(45) Date of Patent: Aug. 18, 2026

(54) IMAGE PROCESSING SYSTEM AND METHOD FOR RECOGNITION PERFORMANCE ENHANCEMENT OF CIPV

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 305 days.

(21) Appl. No.: 18/463,365

(22) Filed: Sep. 8, 2023

(65) Prior Publication Data

US 2024/0135723 A1 Apr. 25, 2024
US 2024/0233399 A9 Jul. 11, 2024

(30) Foreign Application Priority Data

Oct. 20, 2022 (KR) ........................ 10-2022-0135307

(51) Int. Cl.
*G06V 20/58* (2022.01)
*B60W 30/14* (2006.01)
*G06T 7/50* (2017.01)
*H04N 5/262* (2006.01)

(52) U.S. Cl.
CPC ................ *G06V 20/58* (2022.01); *G06T 7/50* (2017.01); *H04N 5/2628* (2013.01); *B60W 30/14* (2013.01); *B60W 2420/403* (2013.01); *G06T 2207/30252* (2013.01)

(58) Field of Classification Search
CPC .......... G06V 20/58; G06V 20/56; G06T 7/50; G06T 2207/30252; G06T 3/4023; G06T 3/18; H04N 5/2628; B60W 2420/403
See application file for complete search history.

(56) References Cited

U.S. PATENT DOCUMENTS

2017/0267178 A1* 9/2017 Shiga ..................... B60K 35/00
2022/0148283 A1* 5/2022 Aoki ...................... G06V 10/25
2022/0301320 A1* 9/2022 Hashimoto ....... B60W 30/0956

FOREIGN PATENT DOCUMENTS

KR 20210027894 A 3/2021

* cited by examiner

*Primary Examiner* — Andrew M Moyer
*Assistant Examiner* — Conor A O'Malley
(74) *Attorney, Agent, or Firm* — NovoTechIP International PLLC

(57) ABSTRACT

An image processing method and system mounted on a vehicle for recognition performance enhancement of a closest in-path vehicle (CIPV) includes a size adjusting unit configured to convert a size of input forward image data of the vehicle to provide converted forward image data of a predetermined size to reduce an amount of computation necessary for recognition of an object in the input forward image data. An object recognition unit analyzes the converted forward image data to recognize an object included in the converted forward image data. After object recognition, a result processing unit inversely converts a size of the recognized object in response to an operation of the size adjusting unit to resolve image distortion included in the converted image data and, following inversely converting the size of the recognized object, analyzes an actual distance between the recognized object and the vehicle.

15 Claims, 8 Drawing Sheets

A) RESULT OF NORMAL IMAGE RESIZING
(2048*1024 -> 1024*512)

B) RESULT OF IMAGE RESIZING WITH DIFFERENT DECIMATION FACTOR FOR EACH REGION (2048*1024->1024*512)

(A)HORIZONTAL COORDINATE (B)VERTICAL COORDINATE

IMAGE PROCESSING SYSTEM AND METHOD FOR RECOGNITION PERFORMANCE ENHANCEMENT OF CIPV

CROSS-REFERENCE TO RELATED APPLICATIONS

This application claims priority under 35 U.S.C. § 119 to Korean Patent Application No. 10-2022-0135307, filed on Oct. 20, 2022, in the Korean Intellectual Property Office, the disclosure of which is incorporated herein by reference in its entirety.

TECHNICAL FIELD

The following disclosure relates to image processing system and method for recognition performance enhancement of a closest in-path vehicle (CIPV), and more particularly, to image processing system and method for recognition performance enhancement of CIPV which may enhance recognition performance of the CIPV of an object recognition network used by an embedded system having a limited amount of computation.

BACKGROUND

An advanced driver assistance system (ADAS) refers to every function that assists a driver to drive a vehicle safely and conveniently.

The ADAS may provide various functions by identifying a forward environment of the vehicle through forward image data or forward sensing data. Therefore, it is most important for the ADAS to more accurately analyze the forward image data.

An object recognition network has been gradually developed to perform these functions. The object recognition network may classify a type (or class) of an object in an input image data and recognize the size and position of a rectangle surrounding the object to analyze distance information between the vehicle and the object.

In general, the center point of the forward image data may be a vehicle travel direction in a road driving situation, and a faraway vehicle may appear smaller and a nearby vehicle may appear larger. Accordingly, it is natural that the nearby vehicle may occupy a larger number of pixels in the forward image data.

Therefore, it is more important to recognize a vehicle in its own lane than a vehicle in the next lane, in other words, a closest in-path vehicle (CIPV) or a vehicle positioned in the center of the image (or the vehicle travel direction). The higher recognition performance of the CIPV, the higher ADAS performance such as automatic emergency braking (ABE) or smart cruise control (SCC).

It is apparent that an ADAS function is one of essential functions to ultimately complete autonomous driving technology.

However, the object recognition network used in the vehicle needs to be installed in a system embedded in the vehicle, and may thus inevitably have a limited amount of computation.

In detail, the amount of computation of the network may be proportional to a size of the image and the number of layers. Therefore, the image needs to have a smaller size to secure higher recognition performance by increasing the number of layers.

In particular, recent collecting means of the forward image data (e.g., vehicle camera) that is mounted in the vehicle may provide a full high definition (FHD) resolution (2048*1024) or higher. However, in order to have the maximum recognition performance, the image needs to have a size adjusted to ¼ or less when optimizing the image size and the number of layers.

However, a general object recognition network may have lower recognition performance for a small object than for a large object. Therefore, when reducing the size of the input forward image data to have the maximum recognition performance, a size of the own lane (or own road) positioned far away may also be reduced to lower forward recognition accuracy, thus lowering the ADAS performance such as the AEB or the SCC.

That is, the general object recognition network may have the amount of computation proportional to the size of the input image data. Therefore, the embedded system having a limited amount of computation may reduce the size of the input forward image data and then input the same to the network. In this case, due to an inherent limitation of the object recognition network, in which the recognition performance is lower as the size of the object is smaller, a recognition rate of the faraway vehicle in the own lane may be lower, resulting in a shorter detection distance for a vehicle positioned in front.

SUMMARY

An embodiment of the present disclosure is directed to providing image processing system and method for recognition performance enhancement of a closest in-path vehicle (CIPV) of an object recognition network used by an embedded system having a limited amount of computation by analyzing input image data and differently processing downsamplings of regions having higher and lower importance.

In one general aspect, an image processing system for recognition performance enhancement of a closest in-path vehicle (CIPV) includes: a size adjusting unit converting a size of input forward image data of a vehicle to a predetermined size; an object recognition unit analyzing the converted forward image data and recognizing an object included therein; and a result processing unit inversely converting a size of the recognized object in response to an operation of the size adjusting unit to analyze an actual distance between the recognized object and the vehicle.

The size adjusting unit may set a first predetermined value as a first decimation factor of a first predetermined region range of first predetermined coordinates of the forward image data, and set a second predetermined value as a second decimation factor of a second predetermined region range of second predetermined coordinates of the forward image data, the second predetermined value being a larger decimation factor than the first predetermined value.

The size adjusting unit may set a decimation factor gradually increased from a value that exceeds the first predetermined value to the second predetermined value as a region range is further away from the region range of the first predetermined coordinates based on the region range of the first predetermined coordinates.

The size adjusting unit may set a value between the first predetermined value and the second predetermined value as a decimation factor of a region range of coordinates between the region range of the first predetermined coordinates and the region range of the second predetermined coordinates.

The region range of the first predetermined coordinates may be a predetermined CIPV region.

The result processing unit may include: an inverse conversion unit inversely converting the size of the recognized object in consideration of a region range where the recognized object is positioned, in response to the operation of the size adjusting unit; and an analysis unit analyzing a distance between the vehicle and the recognized object by converting image coordinates of the object inversely converted by the inverse conversion unit into actual distance coordinates in consideration of a predetermined factor based on a basic specification of a means of acquiring the forward image data (i.e., a device used for acquiring the forward image data).

In another general aspect, an image processing method for recognition performance enhancement of a closest in-path vehicle (CIPV) using an image processing system for recognition performance enhancement of CIPV in which each operation is performed by a computation processing means includes: converting an image size (S100) of converting a size of input forward image data of a vehicle to a predetermined size; recognizing an object (S200) of analyzing the converted forward image data and recognizing an object included therein; and processing a result (S300) of inversely converting a size of the recognized object in response to an operation in the converting of the image size (S100) to analyze an actual distance between the recognized object and the vehicle.

In the converting of the image size (S100), a first predetermined value may be set as a decimation factor of a predetermined region range of first predetermined coordinates of the forward image data, and a second predetermined value may be set as a decimation factor of a predetermined region range of second predetermined coordinates of the forward image data, the region range of the first predetermined coordinates being a predetermined CIPV region, and the second predetermined value being a larger decimation factor than the first predetermined value.

In the converting of the image size (S100), a value between the first predetermined value and the second predetermined value may be set as a decimation factor of a region range of coordinates between the region range of the first predetermined coordinates and the region range of the second predetermined coordinates.

In the converting of the image size (S100), a decimation factor may be set to be gradually increased from a value that exceeds the first predetermined value to the second predetermined value as a region range is further away from the region range of the first predetermined coordinates based on the region range of the first predetermined coordinates.

The processing of the result (S300) may include: performing inverse conversion (S310) of inversely converting the size of the recognized object in consideration of a region range where the recognized object is positioned, in response to the operation in the converting of the image size (S100); and performing a distance analysis (S320) of analyzing a distance between the vehicle and the recognized object by converting image coordinates of the inversely converted object into actual distance coordinates in consideration of a predetermined factor based on a basic specification of a means of acquiring the forward image data.

DETAILED DESCRIPTION

Figure 1:
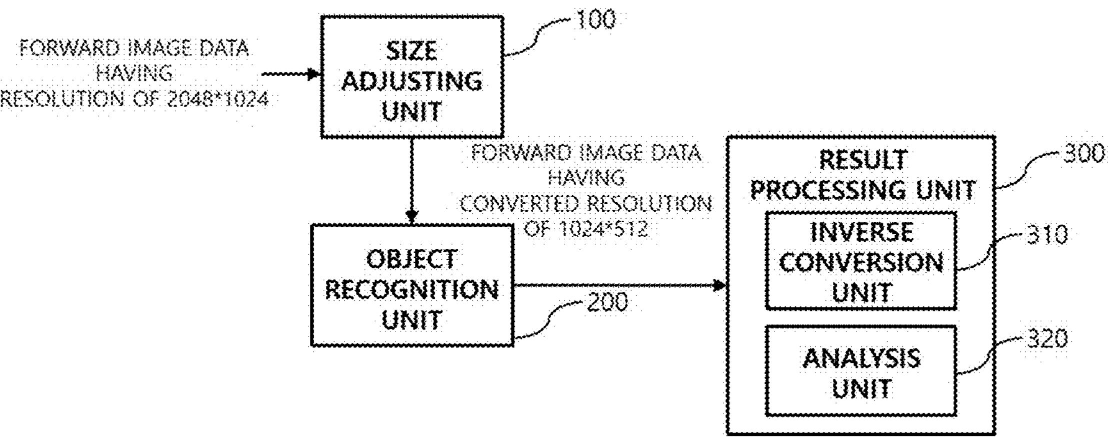
FIG. 1 is an exemplary configuration diagram showing an image processing system for recognition performance enhancement of a closest in-path vehicle (CIPV) according to an embodiment of the present disclosure.

Various objects, advantages and features of the present disclosure are become apparent from the following description of embodiments with reference to the accompanying drawings. The following descriptions of specific structure and function are provided only to describe the embodiments based on a concept of the present disclosure. Therefore, the embodiments of present disclosure may be implemented in various forms, and the present disclosure is not limited thereto. Embodiments of the present disclosure may be various modified and may have several forms, and specific embodiments are thus shown in the accompanying drawings and described in detail in the specification or the present application. However, it is to be understood that the present disclosure is not limited to the specific embodiments, and includes all modifications, equivalents, and substitutions included in the spirit and the scope of the present disclosure. Terms such as 'first', 'second', or the like may be used to describe various components, and the components are not to be construed as being limited to the terms. The terms are used only to distinguish one component from another component. For example, a 'first' component may be named a 'second' component and the 'second' component may also be named the 'first' component, without departing from the scope of the present disclosure. It is to be understood that when one component is referred to as being connected to or coupled to another component, the one component may be connected directly to or coupled directly to another component or be connected to or coupled to another component with still another component interposed therebetween. On the other hand, it is to be understood that when one component is referred to as being connected directly to or coupled directly to another component, the one component may be connected to or coupled to another component without still another component interposed therebetween. Other expressions to describe a relationship between the components, i.e., "~between" and "directly between" or "adjacent to" and "directly adjacent to", should be interpreted in the same manner as above. Terms used in the specification are used to describe the specific embodiments, and are not intended to limit the present disclosure. A term of a singular number may include its plural number unless explicitly indicated otherwise in the context. It is to be understood that a term "include," "have," or the like used in the specification specifies the existence of features, numerals, steps, operations, components, parts or combinations thereof, and does not preclude the existence or addition of one or more other features, numerals, steps, operations, components, parts or combinations thereof. Unless otherwise defined, all terms including technical and scientific terms used herein have the same meaning as commonly understood by those skilled in the art to which the present disclosure pertains. It is to be further understood that terms, such as those defined in commonly used dictionaries, should be interpreted as having a meaning that is consistent with their meaning in the context of the relevant art and is not to be interpreted in an idealized or overly formal sense unless expressly so defined herein. Hereinafter, the embodiments of the present disclosure are described in detail with reference to the accompanying drawings. Like reference numerals denote like components throughout the drawings.

In addition, a system may be a set of components, including devices, mechanisms, means and the like, organized and regularly interacting with each other to perform a required function.

An object recognition network may classify a type (or class) of an object in an input image data, recognize the size and position of a rectangle surrounding the object, and output the same.

Considering this point, when applied to the object recognition network used in a vehicle, a closest in-path vehicle (CIPV) may be recognized by receiving a forward image data of the vehicle, and not only from a vehicle positioned nearby in its own lane where the vehicle is traveling, but also a vehicle positioned far away may be recognized to thus implement an advanced driver assistance system (ADAS) such as automatic emergency braking (AEB) or smart cruise control (SCC).

In general, the object recognition network which is a deep learning network may have an amount of computation proportional to a size of the input image data. The object recognition network used in the vehicle needs to be mounted in an embedded system, and may have a limited amount of computation. Therefore, in a conventional technique, the input image data (or the forward image data) may have a reduced size in its entire region by a ratio adjustment, and may then be input to the object recognition network. In general, the deep learning network may have lower recognition performance as the object has a smaller size to thus lower a vehicle detection distance in the own lane where the vehicle is traveling, in particular, a recognition rate of a faraway vehicle in the own lane, and a front camera sensor may thus have a shorter vehicle detection distance.

For this reason, an ADAS function so far may only be 'semi-autonomous driving', and may simply be a function that assists a driver.

In order to solve this problem, image processing system and method for recognition performance enhancement of CIPV according to an embodiment of the present disclosure aims to adjust an image size by maintaining a high resolution of a pixel value in a CIPV region (or a center point region), which is important in vehicle control, and downsampling a region having lower importance.

That is, the system and method of the present disclosure may dispose the different number of pixels in each region range of the forward image data based on the recognition performance or importance of the CIPV region in the vehicle control. In other words, the system and method of the present disclosure may allocate more pixels to the vehicle in its own lane and allocate less pixels to the other regions, thus enhancing a front vehicle recognition distance.

In this way, the system and method of the present disclosure may reduce an entire image size while maintaining a high resolution of the number of pixels in the CIPV region, which is the most important factor of the ADAS function for the vehicle control, and may thus be operated by the object recognition network used in the embedded system having a limited amount of computation.

The system and method of the present disclosure may enhance a front vehicle recognition rate without increasing a cost, and increase a forward detection distance, thus enhancing reliability of the front camera sensor. The system and method of the present disclosure may expand an operation range of a driving assistance device based on these points, thus implementing a level (LV.) 4 of autonomous driving as well as increased driver convenience.

As shown in FIG. 1, the image processing system for the recognition performance enhancement of the CIPV according to an embodiment of the present disclosure may include a size adjusting unit 100, an object recognition unit 200, and a result processing unit 300. Each component may perform an operation through a computation processing unit such as an electronic control unit (ECU) including a computer that transmits and receives data through a communication channel in the vehicle.

The description describes each component in detail as follows.

The size adjusting unit 100 may convert a size of the input forward image data of the vehicle to a predetermined size.

The forward image data is image data showing the front of the vehicle that is generated by a front camera mounted/installed in the vehicle, a surround view monitor (SVM) front camera system, or the like, and a means (i.e., a device) for inputting the forward image data is not limited as long as the means monitors a front situation of the vehicle.

A recent example of the image processing system for the recognition performance enhancement of the CIPV according to an embodiment of the present disclosure may be a camera of a full high definition (FHD) resolution which is widely used as a means of inputting the forward image data of the vehicle. However, this resolution is only an example and the camera may receive the forward image data having a higher resolution than this resolution.

That is, the size adjusting unit 100 may convert of the input forward image data of the vehicle to the predetermined size regardless of the size of the image data. The predetermined size may be a size in which the maximum recognition performance may be achieved by the object recognition network that is mounted and used in the embedded system of the vehicle. In the present disclosure, the predetermined size is limited to a size of 1024*512, which is only an example, and the image data may be converted into an image having a size larger than 1024 when an object of a larger image may be recognized using a smaller amount of computation in accordance with the development of the object recognition network.

On the other hand, the image may be converted to a smaller size than this size when reducing the amount of computation that may be operated by the object recognition network as many functions are added to the embedded system of the vehicle.

Here, the size adjusting unit 100 may set a different conversion rate based on importance of the region included in the image data rather than simply converting the image size at the same rate for the entire region as in a conventional image size conversion or image size adjustment.

In detail, the size adjusting unit 100 may set a first predetermined value as a decimation factor of a predetermined region range of first predetermined coordinates of the forward image data, and set a second predetermined value as a decimation factor of a predetermined region range of second predetermined coordinates of the forward image data.

Here, the region range of the first predetermined coordinates may be the CIPV region, that is, a region around the center point of the image, and the region around the center point of the image may correspond to a far region in the own lane due to a feature of the forward image data.

Accordingly, as described above, a recognition rate of the faraway vehicle in the own lane of the CIPV region may be lower when the size of the entire region is collectively reduced for processing the image data by the object recognition network in performing the ADAS function. Therefore, the size adjusting unit 100 may set the corresponding region to the region range of the first predetermined coordinates, and set the first predetermined value as the decimation factor of the corresponding region range to maintain the recognition rate of the faraway vehicle in the own lane as it is.

Next, the size of the object may be maintained as it is in the FHD image to enhance the recognition rate of the faraway vehicle in the own line. Therefore, the size adjusting unit 100 may set '1' as the decimation factor of the region range of the first predetermined coordinates.

The size adjusting unit 100 may be applied to the object recognition network of the embedded system having a limited amount of computation, and a total number of pixels needs to be reduced even though the number of pixels in the region range of the first predetermined coordinates is maintained as it is in the FHD image. Therefore, the second predetermined value may be set as the decimation factor of the region range of the second predetermined coordinates.

Here, the region range of the second predetermined coordinates may be an edge region of the forward image data, which is least needed in performing the ADAS function, and '4' may be set as the decimation factor of the region range of the second predetermined coordinates.

Here, the second predetermined value is not necessarily set to '4', and may be set in proportion to the number of pixels in the input forward image data and the number of pixels that may be analyzed by the object recognition network while maintaining optimal recognition performance.

As described above, the present disclosure shows an embodiment of receiving the forward image data of the FHD resolution and setting the size of 1024*512 as the size for the maximum recognition performance by the object recognition network. Therefore, the decimation factor of the region range of the second predetermined coordinates may be proportionally increased to '4' when '1' is the decimation factor of the region range of the first predetermined coordinates.

In this way, the number of image pixels in the region range of the second predetermined coordinates may be reduced by ¼ compared to the number of image pixels in the region range of the first predetermined coordinates.

In summary, the second predetermined value may be set to be a larger decimation factor than the first predetermined value, and a factor value may be proportional to the size of the input image data and the size of the image data to be output.

Figure 2A:
FIGS. 2A and 2B are exemplary views comparing input forward image data and resized forward image data by image processing system and method for recognition performance enhancement of CIPV according to an embodiment of the present disclosure.
Figure 2B:

FIGS. 2A and 2B show a result of converting the input forward image data according to an embodiment of the size adjusting unit 100.

In detail, FIG. 2A shows general image data acquired by converting the forward image data having the FHD resolution to the size of 1024*512, and FIG. 2B shows image data acquired by setting a different decimation factor for each coordinate region range of the image and converting the image data to the size of 1024*512, according to an embodiment of the size adjusting unit 100.

As shown in FIG. 2A, when the size conversion is performed on the entire region of the forward image data at the same rate, the faraway vehicle in the own lane may also be smaller at the same rate, thus inevitably lowering the recognition rate.

On the other hand, as shown in FIG. 2B, the present disclosure may maintain the FHD resolution of the CIPV region, which is the region around the center point, and more greatly lower the resolution of the edge region, thereby ensuring that although the edge region (or a surrounding region) has a lower resolution, the CIPV region, which is most needed to perform the ADAS function, has more pixels to thus provide a higher recognition rate.

Figure 3:
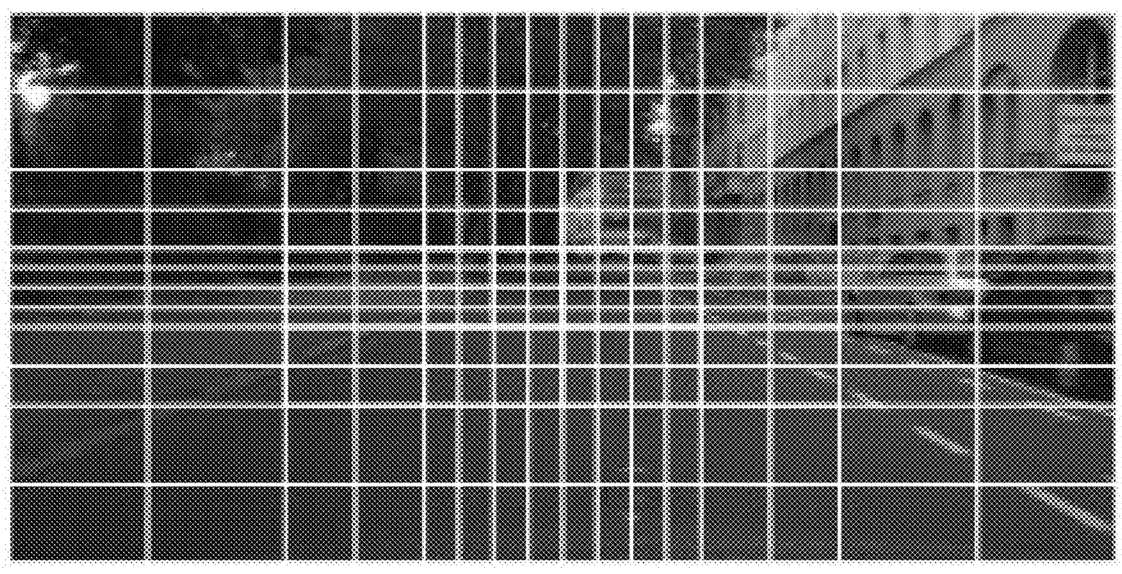
FIG. 3 is an exemplary view showing a size of a pixel in a region range of the resized forward image data by the image processing system and method for the recognition performance enhancement of the CIPV according to an embodiment of the present disclosure.

FIG. 3 is an embodiment showing pixel arrangement (or pixel size) of the image data acquired by converting the input forward image data by an embodiment of the size adjusting unit 100.

As shown in FIG. 3, it may be seen that more pixels are allocated to the faraway own lane by disposing the different number of pixels based on the importance or recognition performance need of each region of the forward image data.

Here, as shown in FIG. 3, the size adjusting unit 200 may set not only the decimation factors of the region around the center point which is the region range of the first predetermined coordinates and the edge region which is the region range of the second predetermined coordinates but also a decimation factor of a region between the two regions.

For example, a value that exceeds the first predetermined value may be gradually increased to the second predetermined value as the region range is further away from the region range of the first predetermined coordinates based on the region range of the first predetermined coordinates.

That is, it may be seen in FIG. 3 that the number of image pixels may be gradually reduced because the region range has a gradually larger decimation factor as the region range is moved from the region range of the first predetermined coordinates to the region range of the second predetermined coordinates, in other words, as the region range is further positioned diagonally from the region range of the first predetermined coordinates.

For another example, a value between the first predetermined value and the second predetermined value may be set as a decimation factor of a region range of coordinates between the region range of the first predetermined coordinates and the region range of the second predetermined coordinates.

That is, it may be seen in FIG. 3 that the x-axis and y-axis of the region range are set to have a smaller decimation factor than that of the region range diagonally positioned described above based on the region range of the first predetermined coordinates. Accordingly, the different decimation factor may be set based on the need/importance of each region to maximize efficiency of an object recognition result in providing the ADAS function.

The object recognition unit 200 may analyze the forward image data converted by the size adjusting unit 100 and recognize an object included therein.

To this end, the object recognition unit 200 may use the object recognition network configured to have a limited amount of computation in the embedded system of the vehicle.

Recognizing the object included in the input image data and outputting its result is a normal operation of the object recognition network, and the description omits its details.

The result processing unit 300 may receive the recognition result from the object recognition unit 200, and inversely convert a size of the recognized object in response to the operation of the size adjusting unit 100 to analyze an actual distance between the recognized object and the vehicle.

In other words, as shown in FIG. 2B and FIG. 3, a shape of the object may be changed by image distortion when performing the size conversion by setting the different decimation factor for each region of the input forward image data by the operation of the size adjusting unit 100. In particular, a region having the larger decimation factor may also have a larger distortion.

An output value by the object recognition unit 200 is an analysis result of the converted image data including the image distortion, and may thus have very low accuracy when this value is applied to a distance analysis as it is.

Accordingly, as shown in FIG. 1, the result processing unit 300 may include an inverse conversion unit 310 and an analysis unit 320 to resolve the image distortion included in the converted image data and then perform the distance analysis.

First, the inverse conversion unit 310 may inversely convert the size of the recognized object in consideration of a region range where the recognized object is positioned, in response to the operation of the size adjusting unit 100.

Figure 4A:
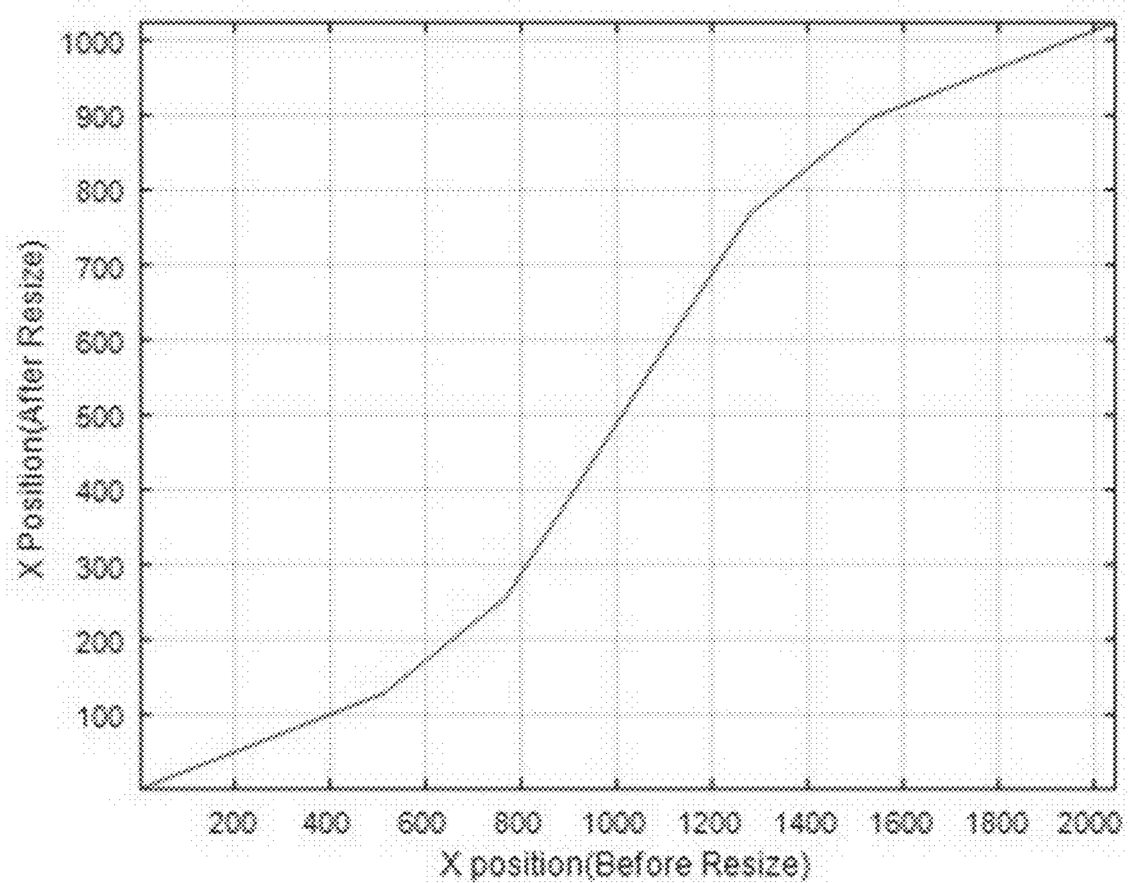
FIGS. 4A and 4B are exemplary views showing a coordinate conversion gradient curve between the input forward image data and the resized forward image data by the image processing system and method for the recognition performance enhancement of the CIPV according to an embodiment of the present disclosure.
Figure 4B:
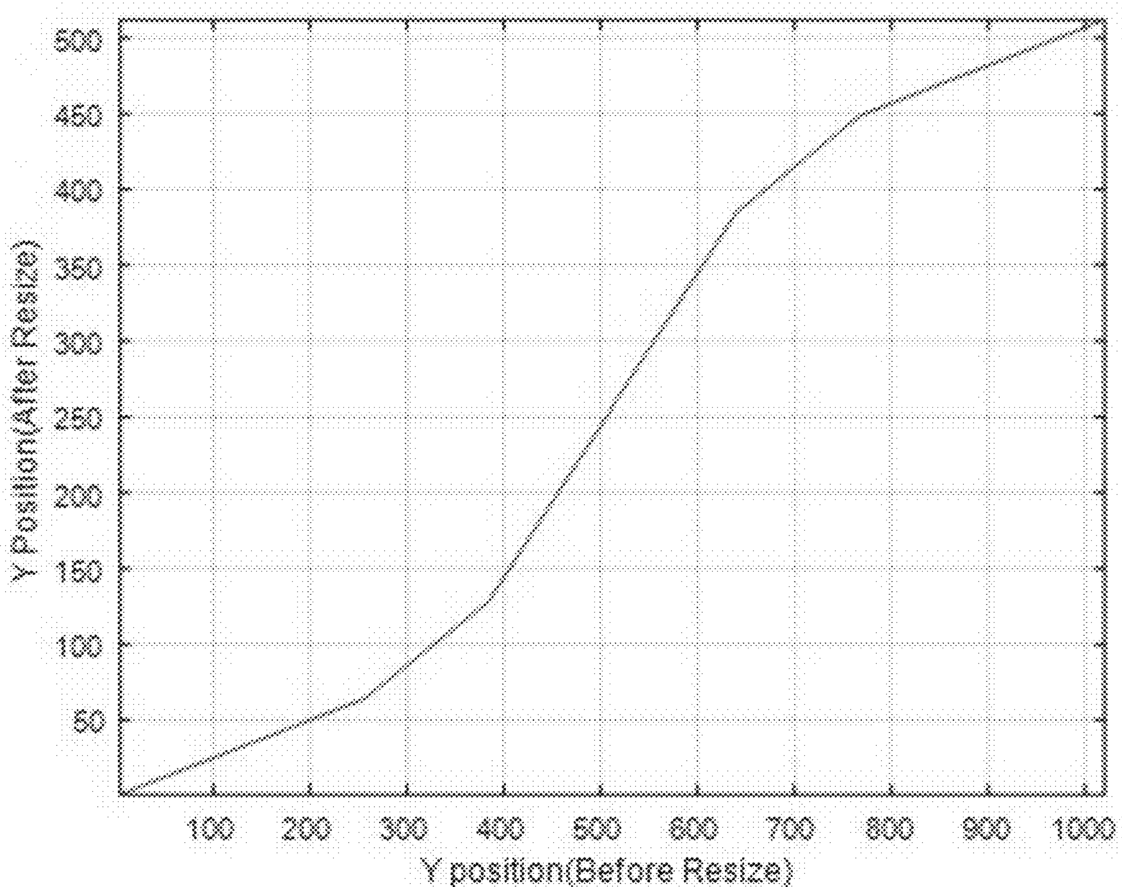

In detail, by the operation of the size adjusting unit 100, '1' may be set as the decimation factor of the region range of the first predetermined coordinates, '4' may be set as the decimation factor of the region range of the second predetermined coordinates, and '1<x<4' may be set as the decimation factor of the region range of the first predetermined coordinates and the region range of the second predetermined coordinates. FIGS. 4A and 4B show that this operation is represented by a coordinate conversion curve.

As shown in FIGS. 4A and 4B, '1' may be a gradient at the center coordinates of the image, and the size adjusting unit 100 may convert the input forward image data by using the conversion curve in which the gradient is changed at the edge region, which may be expressed as the conversion coordinate. Image coordinates having integer values may have a 1:1 correspondence in the conversion curve, and may also be inversely converted.

Considering this point, the inverse conversion unit 310 may convert the size of the recognized object by inversely applying the decimation factor set in the region range where the recognized object is positioned.

Figure 5:
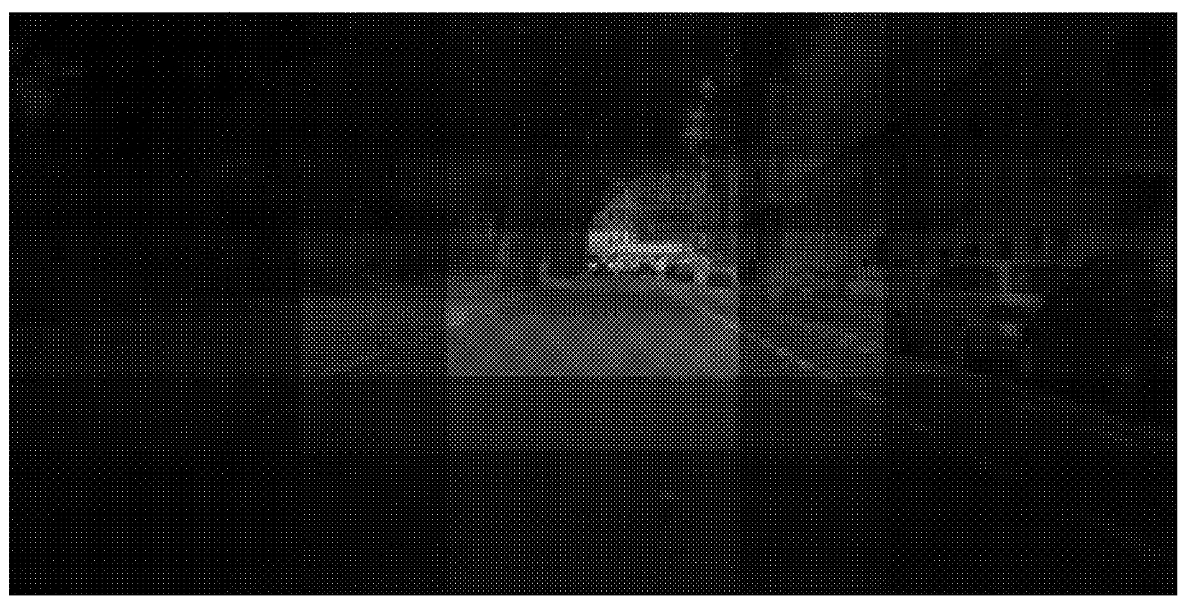
FIG. 5 is an exemplary view showing a result of restoring the resized forward image data to an original image data size by the image processing system and method for the recognition performance enhancement of the CIPV according to an embodiment of the present disclosure.

FIG. 5 is an exemplary view showing a result of restoring the data to an original image data size (2048*1024) by the operation of the inverse conversion unit 310.

In this way, the image data may be converted to actual distance coordinates after restored to the coordinates of the original data size.

The analysis unit 320 may analyze a distance between the vehicle and the recognized object by converting image coordinates of the object inversely converted by the inverse conversion unit 310, that is, image coordinates of the restored object, into the actual distance coordinates in consideration of a predetermined factor based on a basic specification of a means of acquiring the forward image data.

In detail, the analysis unit 320 may predetermine the factor for converting the image coordinates to the actual distance coordinates based on the basic specification (intrinsic parameter/extrinsic parameter) of the camera through a camera calibration process, and then convert the restored image coordinates of the object by the inverse conversion unit 310 into the actual distance coordinates.

The analysis unit 320 may analyze the distance between the own vehicle and the recognized vehicle by using the image coordinates (or the bottom of the rectangle) where the recognized vehicle object and the ground meet each other. This process may correspond to a normal analysis operation, and the description thus omits its details.

That is, the image processing system for the recognition performance enhancement of the CIPV according to an embodiment of the present disclosure may reduce the total number of pixels so that the input forward image data having the high resolution may be analyzed by the object recognition network of the embedded system having a limited amount of computation to enhance the recognition rate of the vehicle in the own lane, which is most important in the ADAS that utilizes the recognition result of the object recognition network, despite reducing the image size, thereby increasing the vehicle detection distance.

Here, in reducing the total number of pixels, the system of the present disclosure may maintain reliability of distance information between the recognized object and the vehicle by setting the different decimation factors based on the importance/utilization of each region of the forward image data, and resolving the resulting image distortion through the post-processing.

Figure 6:
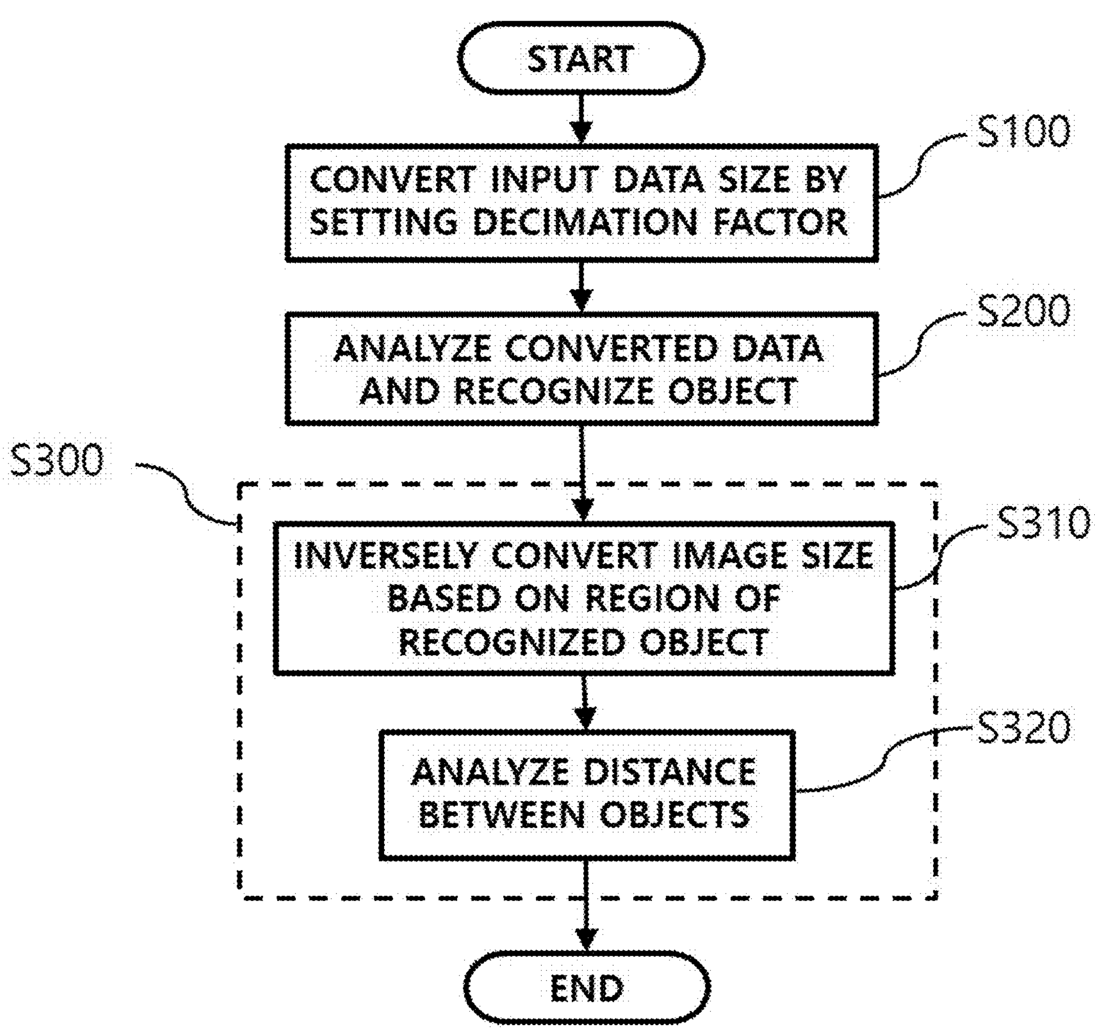
FIG. 6 is an exemplary view showing a sequence of an image processing method for recognition performance enhancement of CIPV according to an embodiment of the present disclosure.

FIG. 6 is an exemplary view showing a sequence of an image processing method for recognition performance enhancement of a closest in-path vehicle (CIPV) according to an embodiment of the present disclosure.

As shown in FIG. 6, the image processing method for the recognition performance enhancement of the CIPV according to an embodiment of the present disclosure may include converting an image size (S100), recognizing an object (S200), and processing a result (S300), and an operation of each step may be performed by a computation processing means in the image processing system for the recognition performance enhancement of the CIPV.

The description describes each step in detail as follows.

In the converting of the image size (S100), the size adjusting unit 100 may convert the size of the input forward image data of the vehicle to the predetermined size.

The forward image data is image data showing the front of the vehicle that is generated by a front camera mounted/installed in the vehicle, a surround view monitor (SVM) front camera system, or the like, and means for inputting the forward image data is not limited as long as a front situation of the vehicle may be monitored.

In the converting of the image size (S100), the input forward image data of the vehicle may be converted to the predetermined size regardless of the size of the image data. The predetermined size may be a size in which the maximum recognition performance may be achieved by the object recognition network that is mounted and used in the embedded system of the vehicle. In the present disclosure, the predetermined size is limited to a size of 1024*512, which is only an example, and the image data may be converted into an image having a size larger than 1024 when the object of a larger image may be recognized using a smaller amount of computation in accordance with the development of the object recognition network.

On the other hand, the image may be converted to a smaller size than this size when reducing the amount of computation that may be operated by the object recognition network as many functions are added to the embedded system of the vehicle.

A different conversion rate may be set based on the importance of the region included in the image data rather than simply converting the image size at the same rate for the entire region as in the conventional image size conversion or image size adjustment.

In detail, in the converting of the image size (S100), the first predetermined value may be set as the decimation factor of the predetermined region range of the first predetermined coordinates of the forward image data, and the second predetermined value may be set as the decimation factor of the predetermined region range of the second predetermined coordinates of the forward image data.

Here, the region range of the first predetermined coordinates may be the CIPV region, that is, the region around the center point of the image, and the region around the center point of the image may correspond to the far region in the own lane due to the feature of the forward image data.

Accordingly, as described above, the recognition rate of the faraway vehicle in the own lane of the CIPV region may be lower when the size of the entire region is collectively reduced for processing the image data by the object recognition network in performing the ADAS function.

Therefore, the corresponding region may be set to the region range of the first predetermined coordinates, and the first predetermined value may be set as the decimation factor of the corresponding region range to maintain the recognition rate of the faraway vehicle in the own lane as it is.

Next, the size of the object may be maintained as it is in the FHD image to enhance the recognition rate of the faraway vehicle in the own line. Therefore, '1' may be set as the decimation factor of the region range of the first predetermined coordinates.

The converting of the image size (S100) may be applied to the object recognition network of the embedded system having the limited amount of computation, and the total number of pixels needs to be reduced even though the number of pixels in the region range of the first predetermined coordinates is maintained as it is in the FHD image. Therefore, the second predetermined value may be set as the decimation factor of the region range of the second predetermined coordinates.

Here, the region range of the second predetermined coordinates may be the edge region of the forward image data, which is least needed in performing the ADAS function, and '4' may be set as the decimation factor of the region range of the second predetermined coordinates.

Here, the second predetermined value is not necessarily set to '4', and may be set in proportion to the number of pixels in the input forward image data and the number of pixels that may be analyzed by the object recognition network while maintaining optimal recognition performance.

As described above, the present disclosure shows an embodiment of receiving the forward image data of the FHD resolution and setting the size of 1024*512 as the size for the maximum recognition performance by the object recognition network. Therefore, the decimation factor of the region range of the second predetermined coordinates may be proportionally increased to '4' when '1' is the decimation factor of the region range of the first predetermined coordinates.

In this way, the number of image pixels in the region range of the second predetermined coordinates may be reduced by ¼ compared to the number of image pixels in the region range of the first predetermined coordinates.

In summary, the second predetermined value may be set to be the larger decimation factor than the first predetermined value, and the factor value may be proportional to the size of the input image data and the size of the image data to be output.

FIGS. 2A and 2B show a result of converting the input forward image data by an operation performed in the converting of the image size (S100).

In detail, FIG. 2A shows the general image data acquired by converting the forward image data having the FHD resolution to the size of 1024*512, and FIG. 2B shows the image data acquired by setting the different decimation factor for each coordinate region range of the image and converting the image data to the size of 1024*512.

As shown in FIG. 2A, when the size conversion is performed on the entire region of the forward image data at the same rate, the faraway vehicle in the own lane may also be smaller at the same rate, thus inevitably lowering the recognition rate.

On the other hand, as shown in FIG. 2B, the present disclosure may maintain the FHD resolution of the CIPV region, which is the region around the center point, and more greatly lower the resolution of the edge region, thereby ensuring that although the edge region (or a surrounding region) has a lower resolution, the CIPV region, which is most needed to perform the ADAS function, has more pixels to thus provide the higher recognition rate.

FIG. 3 is an embodiment showing the pixel arrangement (or pixel size) of the image data acquired by converting the input forward image data by an embodiment of the size adjusting unit 100.

As shown in FIG. 3, it may be seen that more pixels are allocated to the faraway own lane by disposing the different number of pixels based on the importance or recognition performance need of each region of the forward image data.

Here, as shown in FIG. 3, in the converting of the image size (S100), not only the decimation factors of the region around the center point which is the region range of the first predetermined coordinates and the edge region which is the region range of the second predetermined coordinates but also the decimation factor of the region between the two regions may be set.

For example, the value that exceeds the first predetermined value may be gradually increased to the second predetermined value as the region range is further away from the region range of the first predetermined coordinates based on the region range of the first predetermined coordinates.

That is, it may be seen in FIG. 3 that the number of image pixels may be gradually reduced because the region range has the gradually larger decimation factor as the region range is moved from the region range of the first predetermined coordinates to the region range of the second predetermined coordinates, that is, as the region range is further positioned diagonally from the region range of the first predetermined coordinates.

For another example, a value between the first predetermined value and the second predetermined value may be set as a decimation factor of a region range of coordinates between the region range of the first predetermined coordinates and the region range of the second predetermined coordinates.

That is, it may be seen in FIG. 3 that the x-axis and y-axis of the region range are set to have the smaller decimation factor than that of the region range diagonally positioned described above based on the region range of the first predetermined coordinates. Accordingly, the different decimation factor may be set based on the need/importance of each region to maximize the efficiency of the object recognition result in providing the ADAS function.

In the recognizing of the object (S200), the object recognition unit 200 may analyze the forward image data converted in the converting of the image size (S100) and recognize the object included therein.

To this end, the object recognition network configured to have a limited amount of computation in the embedded system of the vehicle may be used.

Recognizing the object included in the input image data and outputting its result is the general operation of the object recognition network, and the description omits its details.

In the processing of the result (S300), the result processing unit 300 may receive the recognition result acquired in the recognizing of the object (S200), and inversely convert the size of the recognized object in response to the operation in the converting of the image size (S100) to analyze the actual distance between the recognized object and the vehicle.

In other words, as shown in FIG. 2B and FIG. 3, the shape of the object may be changed by the image distortion when performing the size conversion by setting the different decimation factor for each region of the input forward image data by the operation in the converting of the image size (S100). In particular, the region having the larger decimation factor may also have the larger distortion.

In the recognizing of the object (S200), an analysis value may be generated regardless of the distortion of the input image data, and the accuracy may be very low when this value is applied to the distance analysis as it is.

Accordingly, as shown in FIG. 6, the processing of the result (S300) may include performing inverse conversion (S310) and performing a distance analysis (S320).

In the performing of the inverse conversion (S310), the size of the recognized object may be inversely converted in consideration of a region range where the recognized object is positioned, in response to the operation in the converting of the image size (S100).

In detail, by the operation in the converting of the image size (S100), '1' may be set as the decimation factor of the region range of the first predetermined coordinates, '4' may be set as the decimation factor of the region range of the second predetermined coordinates, and '1<x<4' may be set as the decimation factor of the region range of the first predetermined coordinates and the region range of the second predetermined coordinates. FIGS. 4A and 4B show that this operation is represented by the coordinate conversion curve.

As shown in FIGS. 4A and 4B, '1' may be the gradient at the center coordinates of the image, and the input forward image data may be converted by using the conversion curve in which the gradient is changed at the edge region, which may be expressed as the conversion coordinate. The image coordinates having integer values may have the 1:1 correspondence in the conversion curve, and may also be inversely conversed.

Considering this point, in the performing of the inverse conversion (S310), the size of the recognized object may be converted by inversely applying the decimation factor set in the region range where the recognized object is positioned.

FIG. 5 is the exemplary view showing the result of restoring the data to the original image data size (2048*1024) in the performing of the inverse conversion (S310).

In this way, the image data may be converted to the actual distance coordinates after restored to the coordinates of the original data size.

In the performing of the distance analysis (S320), a distance between the vehicle and the recognized object may be analyzed by converting image coordinates of the object inversely converted in the performing of the inverse conversion (S310), that is, image coordinates of the restored object, into the actual distance coordinates in consideration of the predetermined factor based on the basic specification of the means of acquiring the forward image data.

In detail, the factor for converting the image coordinates to the actual distance coordinates may be predetermined based on the basic specification (intrinsic parameter/extrinsic parameter) of the camera through the camera calibration process, and then the restored image coordinates of the object may be converted in the performing of the inverse conversion (S310) into the actual distance coordinates.

The distance between the own vehicle and the recognized vehicle may be analyzed by using the image coordinates (or the bottom of the rectangle) where the recognized vehicle object and the ground meet each other. This process may correspond to a normal analysis operation, and the description thus omits its details.

As set forth above, the image processing system and method for the recognition performance enhancement of the CIPV according to the present disclosure may adjust the image size by maintaining the high resolution of the pixel value in the CIPV region (or the center point region), which is important in the vehicle control, and downsampling the region having the lower importance.

In detail, the system and method of the present disclosure may dispose the different number of pixels in each region range of the forward image data based on the recognition performance or importance of the CIPV region in the vehicle control. In other words, the system and method of the present disclosure may allocate the more pixels to the vehicle in its own lane and allocate the less pixels to the other regions, thus enhancing the front vehicle recognition distance.

In this way, the system and method of the present disclosure may reduce the entire image size while maintaining the high resolution of the number of pixels in the CIPV region, which is the most important factor of the ADAS function for the vehicle control, and may thus be operated by the object recognition network used in the embedded system having a limited amount of computation.

The system and method of the present disclosure may enhance the front vehicle recognition rate without increasing the cost, and increase the forward detection distance, thus enhancing the reliability of the front camera sensor. The system and method of the present disclosure may expand the operation range of the driving assistance device based on these points, thus implementing the level (LV.) 4 of autonomous driving as well as the increased driver convenience.

That is, the system and method of the present disclosure may reduce the total number of pixels so that the input forward image data having the high-resolution may be analyzed by the object recognition network of the embedded system having a limited amount of computation to enhance the recognition rate of the vehicle in the own lane, which is most important in the ADAS that utilizes the recognition result of the object recognition network, despite reducing the image size, thereby increasing the vehicle detection distance.

Here, in reducing the total number of pixels, the system and method of the present disclosure may maintain the reliability of the distance information between the recognized object and the vehicle by setting the different decimation factors based on the importance/utilization of each region of the forward image data, and resolving the resulting image distortion through the post-processing.

Although the embodiments of the present disclosure are described as above, the embodiments disclosed in the present disclosure are provided not to limit the spirit of the present disclosure, but to describe the present disclosure. Therefore, the spirit of the present disclosure may include not only each disclosed embodiment but also a combination of the disclosed embodiments. Further, the scope of the present disclosure is not limited by these embodiments. In addition, it is apparent to those skilled in the art to which the present disclosure pertains that various variations and modifications could be made without departing from the scope of the present disclosure as defined by the appended claims, and all such appropriate variations and modifications should also be understood to fall within the scope of the present disclosure as equivalents.

What is claimed is:

1. An image processing system, embedded in mounted on a vehicle and having a predetermined amount of computation resources, for recognition performance enhancement of a closest in-path vehicle (CIPV) without exceeding the computation resources of the image processing system, the system comprising:

a size adjusting unit configured to convert a size of input forward image data of the vehicle, which input forward image data is obtained from a camera mounted on the vehicle, to provide converted forward image data of a predetermined size to reduce an amount of computation necessary for recognition of an object in the input forward image data;

an object recognition unit configured to analyze the converted forward image data and to recognize the object included in the converted forward image data; and a result processing unit configured to inversely convert a size of the recognized object in response to an operation of the size adjusting unit to resolve image distortion included in the converted image data and, following inversely converting the size of the recognized object, to analyze an actual distance between the recognized object and the vehicle without exceeding the computation resources of the image processing system, wherein the image processing system is part of an advanced driver assistance system (ADAS) configured to be used for semi-autonomous or autonomous driving of the vehicle.

2. The system of claim 1, wherein the size adjusting unit is configured to:

set a first predetermined value as a first decimation factor of a first predetermined region range of first predetermined coordinates of the forward image data, and set a second predetermined value as a second decimation factor of a second predetermined region range of second predetermined coordinates of the forward image data, wherein the second predetermined value is a larger decimation factor than the first predetermined value.

3. The system of claim 2, wherein the size adjusting unit is configured to set a decimation factor which is increased from a value that exceeds the first predetermined value to the second predetermined value as a region range is moved further away from the first region range of the first predetermined coordinates based on the first region range of the first predetermined coordinates.

4. The system of claim 2, wherein the size adjusting unit is configured to set a value between the first predetermined value and the second predetermined value as a decimation factor of a region range of coordinates between the first region range of the first predetermined coordinates and the second region range of the second predetermined coordinates.

5. The system of claim 2, wherein the first region range of the first predetermined coordinates is a predetermined CIPV region.

6. The system of claim 2, wherein the result processing unit includes:

an inverse conversion unit configured to inversely convert the size of the recognized object in consideration of a region range where the recognized object is positioned, in response to an operation of the size adjusting unit; and an analysis unit configured to analyze a distance between the vehicle and the recognized object by converting image coordinates of the object inversely converted by the inverse conversion unit into actual distance coordinates in consideration of a predetermined factor based on a basic specification of a device used for acquiring the forward image data.

7. An image processing method for recognition performance enhancement of a closest in-path vehicle (CIPV) using an image processing system, embedded in a vehicle and having a predetermined amount of computation resources, for recognition performance enhancement of CIPV in which each operation is performed by a computation processing device without exceeding the computation resources of the image processing system, the method comprising:

converting an image size of input forward image data of a vehicle, which input forward image data is obtained from a camera mounted on the vehicle, to provide converted forward image data of a predetermined size to reduce an amount of computation necessary for recognition of an object in the input forward image data;

recognizing the object by analyzing the converted forward image data and recognizing the object included in the converted forward image data; and inversely converting a size of the recognized object in response to an operation in the converting of the image size to resolve image distortion included in the converted image data and, following inversely converting the size of the recognized object, analyzing an actual distance between the recognized object and the vehicle without exceeding the computation resources of the image processing system, wherein the image processing system is part of an advanced driver assistance system (ADAS) configured to be used for semi-autonomous or autonomous driving of the vehicle.

8. The method of claim 7, wherein in the converting of the image size:

a first predetermined value is set as a first decimation factor of a first predetermined region range of first predetermined coordinates of the forward image data, and a second predetermined value is set as a second decimation factor of a second predetermined region range of second predetermined coordinates of the forward image data, the region range of the first predetermined coordinates is a predetermined CIPV region, and the second predetermined value is a larger decimation factor than the first predetermined value.

9. The method of claim 8, wherein, in the converting of the image size, a value between the first predetermined value and the second predetermined value is set as a decimation factor of a region range of coordinates between the first region range of the first predetermined coordinates and the second region range of the second predetermined coordinates.

10. The method of claim 8, wherein, in the converting of the image size, a decimation factor is set to be increased from a value that exceeds the first predetermined value to the second predetermined value as a region range is moved further away from the first region range of the first predetermined coordinates based on the first region range of the first predetermined coordinates.

11. The method of claim 8, wherein the method further includes:

performing inverse conversion of inversely converting the size of the recognized object in consideration of a region range where the recognized object is positioned, in response to the operation in the converting of the image size; and performing a distance analysis of analyzing a distance between the vehicle and the recognized object by converting image coordinates of the inversely converted object into actual distance coordinates in consideration of a predetermined factor based on a basic specification of a device used for acquiring the forward image data.

12. The system of claim 1, wherein the result processing unit is configured to inversely convert the size of the recognized object in response to an operation of the size adjusting unit to an original image size of the recognized object included in the input forward image data to analyze an actual distance between the recognized object and the vehicle.

13. The system of claim 1, wherein:

the size adjusting unit converts the size of the input forward image data in a manner which disposes a greater number of pixels in a first predetermined region range of first predetermined coordinates of the forward image data than a number of pixels disposed in a second predetermined region range of second predetermined coordinates of the forward image data; and the object recognition unit is configured to analyze the converted forward image data and to recognize an object included in the first predetermined region range of first predetermined coordinates in the converted forward image data.

14. The system of claim 13, wherein the result processing unit is configured to inversely convert the size of the recognized object in response to an operation of the size adjusting unit to an original image size of the recognized object included in the input forward image data to analyze an actual distance between the recognized object and the vehicle.

15. The system of claim 1, wherein the size adjusting unit is configured to convert the size of input forward image data to reduce an entire image size while maintaining a full high definition (FHD) resolution of a number of pixels in a CIPV region of the input forward image data.

* * * * *